Oct. 11, 1955
E. HARVENGT
2,720,312
ADJUSTABLE BED FOR SEPARATING APPARATUS
Filed June 12, 1951
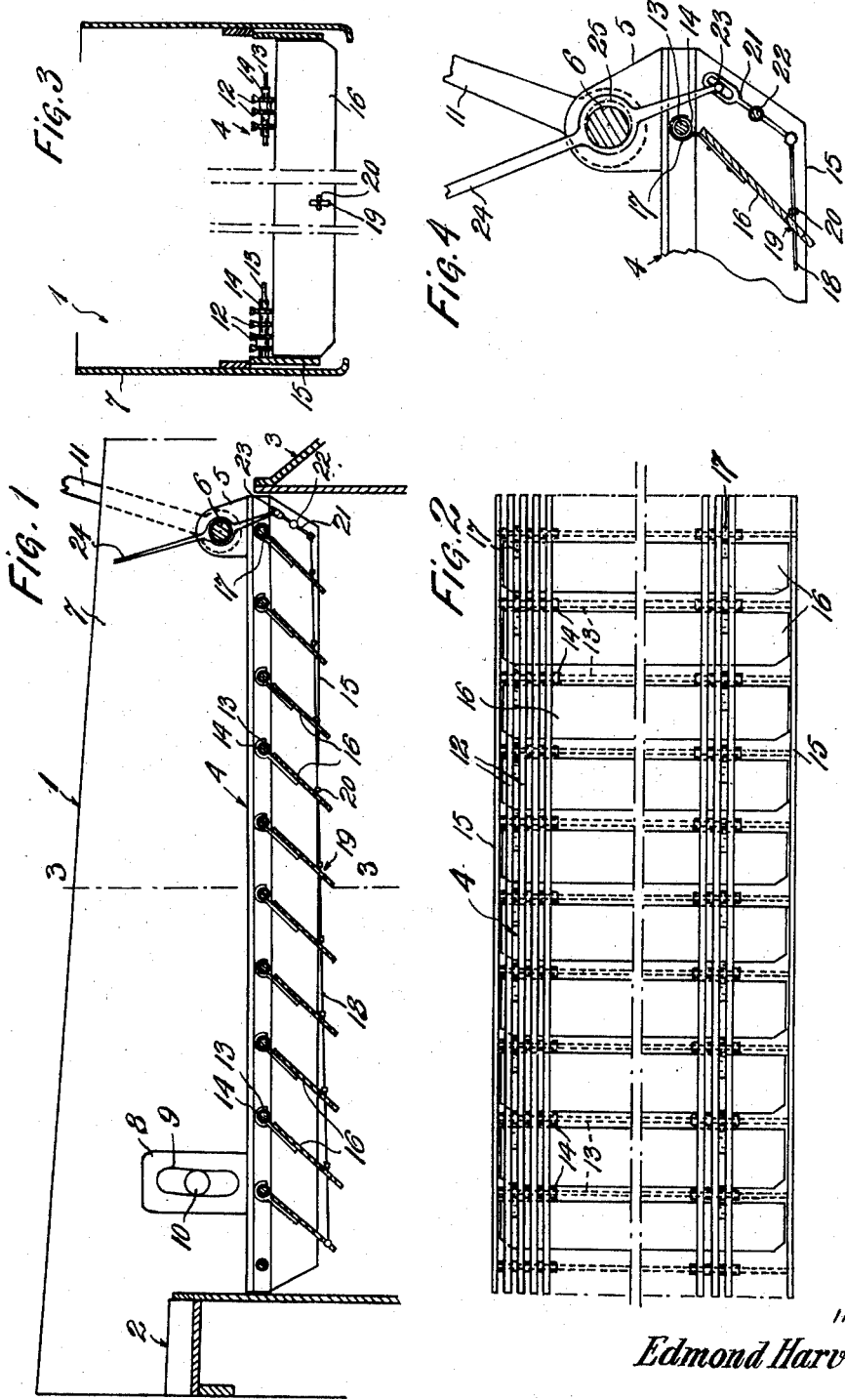
INVENTOR
Edmond Harvengt
ATTORNEY

United States Patent Office 2,720,312
Patented Oct. 11, 1955

2,720,312

ADJUSTABLE BED FOR SEPARATING APPARATUS

Edmond Harvengt, Moustier sur Sambre, Belgium, assignor to Link-Belt Company, Chicago, Ill., a corporation of Illinois Application June 12, 1951, Serial No. 231,169

12 Claims. (Cl. 209—486)

The invention relates to washer boxes, jigs and similar apparatus and particularly concerns improvements in such apparatus with a view to improving the advance and/or the distribution of the products on the sieves or grids thereof.

It has already been proposed to arrange such sieves or grids with a variable and adjustable slope, as well as to impart to these sieves or grids movements including horizontal components of adjustable amplitude.

It has also been proposed to associate with these sieves or grids baffles which are adjustable in position and are arranged on the side of their lower surface and are intended to ensure a desired distribution of the liquid pulses over the area of these sieves or grids.

Although such a distribution may result in liquid currents including horizontal components having an action on the advance of the materials on the sieves or grids, in the proposed arrangements the amplitude of the said horizontal components progressively decreases in value in the direction of advance of the materials.

In accordance with the invention, to improve the advance and/or the distribution of the treated materials over the fixed or movable sieves or grids of washer boxes, jigs or similar apparatus there is provided in association with said grids or sieves a set of baffles arranged on the side of the lower surface thereof and the position of which may be adjustable. These baffles are arranged so that their inclination to the horizontal progressively decreases from one end to the other of the series of baffles in the direction of advance of the said materials. In this way, the generated liquid currents may include horizontal components, the amplitude of which remains the same or increases in the direction of advance. As a result an increase in the output and/or an improved operation of the apparatus is obtained. The baffles are made separate from the sieves or grids, and are mounted in the tanks of the washer boxes, jigs or the like, in accordance with a preferred embodiment by being suspended from the sieves or grids, for angular adjustment with the aid of means operable from the outside of the tanks.

And in order that the invention may be well understood, it will now be described with more detail, in relation with an embodiment of sieve or grid given by way of example and illustrated in the accompanying drawing, in which:

Figure 1 is a vertical sectional view of a washer box having a tiltable grid equipped with baffles, which may be adjustable baffles, in accordance with the invention;

Figure 2 is a plan view of a portion of the grid with certain parts omitted;

Figure 3 is a vertical sectional view along the line 3—3 of Fig. 1;

Figure 4 is a detail view.

With reference to the drawing, 1 designates generally a partially illustrated washer box having an inlet 2 and an outlet 3 for the treated materials, it being understood that the inlet and outlet may be of any suitable forms, similar to or different from those illustrated.

Between the inlet 2 and the outlet 3 is arranged a grid 4 of the adjustable slope type, the said grid being provided at 5 with an integral shaft 6 supported in the walls of the tank 7 of the apparatus, while at its other end it is provided with flaps or ears 8 in which are formed elongated slots 9 through which passes a shaft 10 mounted in the walls of the tank 7. By means of any suitable mechanism, for example, a lever mechanism diagrammatically illustrated at 11, associated with the shaft 6 and manually operable from the outside of the apparatus, the slope of the grid 4 may be varied as desired in accordance with the requirements of the treatment to be effected. The manually operable lever 11, also, may be employed for retaining the grid in the desired position to which it is adjusted.

Although the arrangement could be different, the grid proper is preferably formed with juxtaposed parallel bars 12 connected together at spaced locations by means of rods or bars 13 provided with interposed tie or spacing members 14, the rods or bars 13 being secured in the side walls or flanges 15 forming the frame for the grid.

In accordance with the illustrated embodiment, the baffles 16 of the baffle set associated with the grid or sieve of a washer box, jig or the like are mounted between the walls 15, preferably in such a way that the spaces between the baffles correspond to the spaces between the rods or bars 13.

As may be seen on Fig. 1 of the drawing, the inclination to the horizontal of the successive baffles, varies and decreases progressively from the inlet end to the outlet end of the grid 4, the angle of inclination being preferably comprised between 50° and 60° at the inlet and between 40° and 50° at the outlet although angle values exceeding with several degrees these limits on both sides thereof would be adopted.

The baffles 16 have been illustrated as being formed of flat plates but it is to be understood that within the limits of the invention they may receive other forms, for example a bent or curved shape the convexity of which is directed upwardly or the shape of an elongated S, or also that of a body one face of which is made flat and the other of suitable profile, or both faces are made of suitable profile; combinations of these various shapes may be provided for the baffles of a set of baffles associated with one and the same grid.

Although the baffles may be mounted in fixed positions between the walls 15, with predetermined angles of inclination to the horizontal, it may be of advantage and remains within the limits of the invention, to so arrange them that the inclination of the baffles may be varied where necessary, and to this end said baffles are pivotally mounted between the walls 15.

In accordance with the designed arrangement and as illustrated particularly in Fig. 1, the baffles may be provided with extensions 17 that are bent around the bars 13 or the tie members 14, means being provided to cause the baffles to pivot on the hinges so formed preferably in a simultaneous manner.

Such means may be formed by various mechanisms, one of which has been shown by way of example as comprising a rod 18 passing through corresponding slots 19 formed in the lower portions of the individual baffles 16, the said rod being provided for each baffle, with an abutment 20 and being connected at one end to a lever 21 that pivots about a shaft 22 journaled in the walls 15, the other end of this lever 21 having a loose, or lost motion, pivotal connection with the end 23 of a lever 24 that is pivoted on the shaft 6. By suitably manually moving the lever 24 in one or the other direction, the inclination of all the baffles 16 will be modified simultaneously, the law of change in slope of the baffles from one end to the other of the series remaining however substantially the same. Because the baffles are employed to so direct the liquid impulses as to produce horizontal components of movement of materials toward the discharge ends of the washer boxes, the baffles always occupy angular positions on the left-hand side of the vertical. Therefore, it is not necessary to provide abutments 20 on the rod 18 to the left of the baffles which would function to effect movement of the baffles to the right of the vertical. Because the baffles will always occupy positions on the left-hand side of the vertical, the weight of the individual baffles will hold them in contact with the illustrated abutments 20.

When considering Fig. 1 in which the baffles are shown in a given position of inclination with respect to the grid 4, it may be seen that, while assuming the inclinations of the baffles to be of fixed values with respect to the grid, for any increase in the slope of the grid in the direction of advance of the materials there will be a corresponding decrease in the inclination of the baffles to the horizontal which will result in an increase in the amplitude of the horizontal components of the liquid currents passing through the grid. In accordance with the embodiment of the invention illustrated in Fig. 1, the lever 11 is employed for adjusting the slope of the grid and the lever 24 is employed for adjusting the inclination of the baffles relative to the horizontal. It will be appreciated, however, that if the slope of the grid is changed without effecting any adjustment of the lever 24, the baffles will be moved bodily with the grid. Therefore, the baffles will retain their same angularities relative to the grid but their inclinations relative to the horizontal will be changed. It is an object of the invention, as illustrated in Fig. 4, to so connect the adjusting mechanisms for the grid and the baffles that the setting of the baffles relative to the horizontal may be kept the same although the slope of the grid is changed.

Such a connection may be effected in various ways, for example by pivoting the lever 24 on an eccentric portion of the shaft 6 as indicated in dotted lines at 25 in Fig. 4. With the hub of the lever 24 journaled on the eccentric portion 25 of the shaft 6, it will be seen that if the shaft is rotated in either direction, by means of the lever 11, and the lever 24 is restrained by the operator against angular movement with the shaft 6, the eccentric portion of the shaft will function as a crank to effect bodily movement of the lever 24. This movement will be transmitted to the lever 21 and from it to the baffles 16 through the rod 18.

To further illustrate this action, let it be assumed that the shaft 6 is rotated in a clockwise direction, by means of the lever 11, to produce a corresponding movement of the grid. This rotation of the shaft will cause the axis of its eccentric portion 25 to move through an arc, in a clockwise direction about the axis of the shaft. This crank-like action of the shaft eccentric will produce a longitudinal component of movement of the lever 24 which in turn will cause the lever 21 to move in a counterclockwise direction and thereby move the rod 18 to the right relative to the grid frame. The right-hand movement of the rod will permit the baffles 16 to swing in a counterclockwise direction to offset the aforesaid clockwise direction of movement of the grid.

Although the invention has been particularly described in relation with a grid of adjustable slope, it is not so limited but may be also applied to a grid of fixed position or to a grid on which oscillatory movements are imparted as pointed out previously.

It is known that in apparatus of this kind the treated materials may be subjected on the grid mainly to a simple grading, with or without passage through the grid of certain products, or that a separating action and the passing through the grid of particular categories of products may be sought, for example by operating on a straining bed.

With the invention there is obtained in the first case not only a more rapid advance of the materials towards the outlet end of the grid but, owing to the horizontal components of the liquid currents passing through the grid, an advance of increasing value in direction of that outlet end will be obtained, the particles in the different layers forming the bed of materials, and particularly those of the lower layers, being progressively more widely spaced apart with as a result a progressively greater permeability of the bed and an improved grading. In the second case, if not retained stationary, not only the straining bed may be more easily renewed which results in an improved action thereof, but, in any case for the reasons explained, the component elements thereof are progressively spaced apart, so that the bed may be more easily traversed by the particles the separation of which is desired.

I claim:

1. A jig, comprising a stationary tank having an inlet and an outlet at its opposite ends, a grid assembly positioned in the tank and extending between said inlet and outlet over which the material to be treated travels and through which liquid impulses will pass to effect the desired treatment of the traveling material, means carried by the tank and including a horizontal shaft for supporting the grid assembly for tilting movements relative to the tank about axis of said shaft, means for rotating the shaft to effect tilting of the grid assembly, a set of baffles carried by the grid assembly for pivotal movement relative to and for tilting movement with the latter, said set of baffles being arranged lengthwise of and closely adjacent the bottom surface of the grid assembly and being inclined to the horizontal in the direction of travel of the material over the grid assembly for controlling the direction of movement of the liquid impulses that pass upwardly through the grid assembly, means for interconnecting all of the baffles of the set for simultaneous pivotal movement, and means for actuating said interconnecting means to pivot the baffles.

2. A jig, comprising a stationary tank having an inlet and an outlet at its opposite ends, a grid assembly positioned in the tank and extending between said inlet and outlet over which the material to be treated travels and through which liquid impulses will pass to effect the desired treatment of the traveling material, means carried by the tank for supporting the grid assembly for tilting movements relative to the tank about a horizontal axis, and a set of baffles carried by the grid assembly and tiltable with the latter, means for tilting the grid assembly and the set of baffles as a unit, said set of baffles being arranged lengthwise of and closely adjacent the bottom surface of the grid assembly and being inclined to the horizontal in progressively decreasing amounts from one end to the other of said set in the direction of travel of the material over the grid assembly for controlling the direction of movement of the liquid impulses that pass upwardly through the grid assembly.

3. A jig, comprising a stationary tank having an inlet and an outlet at its opposite ends, a grid assembly positioned in the tank and extending between said inlet and outlet over which the material to be treated travels and through which liquid impulses will pass to effect the desired treatment of the traveling material, means carried by the tank for supporting the grid assembly for tilting movements relative to the tank about a horizontal axis, a set of baffles arranged lengthwise of and closely adjacent the bottom surface of the grid assembly, means for attaching the set of baffles to the grid assembly for pivotal movement relative to said grid assembly about individual horizontal axes, means for interconnecting all of the baffles of the set for simultaneous pivotal movement, means for tilting the grid assembly and the set of baffles as a unit, and means for pivoting the set of baffles relative to the grid assembly to arrange the baffles at the desired inclination relative to the horizontal in the direction of travel of the material over the grid assembly, irrespective of the tilted position of the grid assembly, for controlling the direction of movement of the liquid impulses that pass upwardly through the grid assembly.

4. A jig, comprising a stationary tank having an inlet and an outlet at its opposite ends, a grid assembly positioned in the tank and extending between said inlet and outlet over which the material to be treated travels and through which liquid impulses will pass to effect the desired treatment of the traveling material, means carried by the tank and including a horizontal shaft for supporting the grid assembly for tilting movements relative to the tank about the axis of said shaft, a set of baffles arranged lengthwise of and closely adjacent the bottom surface of the grid assembly, means for attaching the set of baffles to the grid assembly for tilting movement as a unit with the latter and for pivotal movement relative to said grid assembly, means connected to said shaft for tilting the grid assembly, and means including a lever eccentrically mounted on the horizontal shaft for pivoting all of the baffles of the set into the desired inclined positions relative to the horizontal in the direction of travel of the material over the grid assembly for any given tilted position of the grid assembly and for retaining the baffles in the aforesaid desired inclined positions relative to the horizontal while the grid assembly and set of baffles are tilted as a unit.

5. A jig, comprising a stationary tank having an inlet and an outlet at its opposite ends, a grid assembly positioned in the tank and extending between said inlet and outlet over which the material to be treated travels and through which liquid impulses will pass to effect the desired treatment of the traveling material, means carried by the tank for supporting the grid assembly for tilting movements relative to the tank about a horizontal axis, means for tilting the grid assembly, a set of baffles arranged lengthwise of and closely adjacent the bottom surface of the grid assembly, means for attaching the set of baffles to the grid assembly for tilting movement with the latter and for pivotal movement relative to said grid assembly about individual horizontal axes, means for interconnecting all of the baffles of the set so they will occupy positions which are inclined to the horizontal in progressively decreasing amounts from one end to the other of the set in the direction of travel of the material over the grid assembly for controlling the direction of movement of the liquid impulses that pass upwardly through the grid assembly, and means for actuating said interconnecting means for simultaneously pivoting all of the baffles of the set while maintaining their relative progressively decreasing inclined relationship.

6. A jig, comprising a stationary tank having an inlet and an outlet at its opposite ends, a frame positioned in the tank and extending between the said inlet and outlet, a grid assembly over which the material to be treated travels from the inlet to the outlet and through which liquid impulses will pass to effect the desired treatment of the traveling material, said grid assembly including a series of transverse rods for mounting the assembly in said frame, a horizontal shaft carried by the tank for supporting the grid frame for tilting movements relative to the tank about a horizontal axis parallel to and adjacent the tank outlet to vary the plane of the grid assembly relative to the horizontal while maintaining a substantially constant relationship between the discharge end of the grid assembly and the tank outlet, means carried by the tank adjacent said inlet for supporting the receiving end of the grid frame in any of its tilted positions, and a set of baffles suspended from the transverse rods of the grid assembly and inclined to the horizontal in the direction of travel of the material over the grid assembly for controlling the direction of movement of the liquid impulses that pass upwardly through the grid assembly.

7. A jig, comprising a stationary tank having an inlet and an outlet at its opposite ends, a frame positioned in the tank and extending between the said inlet and outlet, a grid assembly carried by the frame over which the material to be treated travels from the inlet to the outlet and through which liquid impulses will pass to effect the desired treatment of the traveling material, means carried by the tank for supporting the grid frame for tilting movements relative to the tank about a horizontal axis parallel to and adjacent the tank outlet to permit varying the plane of the grid assembly relative to the horizontal while maintaining a substantially constant relationship between the discharge end of the grid assembly and the tank outlet, means carried by the tank adjacent said inlet for supporting the receiving end of the grid frame in any of its tilted positions, and a set of baffles supported by the grid assembly and tiltable with the latter and the said frame, the baffles of the set being arranged lengthwise of and closely beneath the grid assembly and being individually inclined to the horizontal in progressively decreasing amounts from one end to the other of the set in the direction of travel of the material over the grid assembly for controlling the direction of movement of the liquid impulses that pass upwardly through the grid assembly.

8. A jig, comprising a stationary tank having an inlet and an outlet at its opposite ends, a frame positioned in the tank and extending between the said inlet and outlet, a grid assembly carried by the frame over which the material to be treated travels from the inlet to the outlet and through which liquid impulses will pass to effect the desired treatment of the traveling material, means carried by the tank for supporting the grid frame for tilting movements relative to the tank about a horizontal axis parallel to and adjacent the tank outlet to permit varying the plane of the grid assembly relative to the horizontal while maintaining a substantially constant relationship between the discharge end of the grid assembly and the tank outlet, means carried by the tank adjacent said inlet for supporting the receiving end of the grid frame in any of its tilted positions, a set of baffles arranged lengthwise of and closely beneath the grid assembly, means for attaching the set of baffles to the grid assembly for pivotal movement relative thereto about individual horizontal axes, means for interconnecting all of the baffles of the set for simultaneous pivotal movement, means for tilting the grid assembly and the set of baffles as a unit, and means for pivoting the set of baffles relative to the grid assembly to arrange the baffles at the desired inclination relative to the horizontal in the direction of travel of the material over the grid assembly, irrespective of the tilted position of the grid assembly, for controlling the direction of movement of the liquid impulses that pass upwardly through the grid assembly.

9. A jig, comprising a stationary tank having an inlet and an outlet at its opposite ends, a frame positioned in the tank and extending between the said inlet and outlet, a grid assembly carried by the frame over which the material to be treated travels from the inlet to the outlet and through which liquid impulses will pass to effect the desired treatment of the traveling material, means carried by the tank and including a horizontal shaft arranged parallel to and adjacent the tank outlet for supporting the grid frame for tilting movements relative to the tank about the axis of the shaft to permit varying the plane of the grid assembly relative to the horizontal while maintaining a substantially constant relationship between the discharge end of the grid assembly and the tank outlet, means carried by the tank adjacent said inlet for supporting the receiving end of the grid frame in any of its tilted positions, a set of baffles arranged lengthwise of and closely beneath the grid assembly, means for attaching the set of baffles to the grid assembly for tilting movement therewith as a unit and for pivotal movement relative to said grid assembly, means for tilting the frame, and means including a lever eccentrically mounted on the horizontal shaft for pivoting all of the baffles of the set into the desired inclined positions relative to the horizontal in the direction of travel of material over the grid assembly for any given tilted position of the grid assembly and its frame and for retaining the baffles in the aforesaid desired inclined positions relative to the horizontal while the grid assembly and set of baffles are tilted as a unit.

10. A jig, comprising a stationary tank having an inlet and an outlet at its opposite ends, a frame positioned in the tank and extending between the said inlet and outlet, a grid assembly carried by the frame over which the material to be treated travels from the inlet to the outlet and through which liquid impulses will pass to effect the desired treatment of the traveling material, means carried by the tank for supporting the grid frame for tilting movements relative to the tank about a horizontal axis parallel to and adjacent the tank outlet to permit varying the plane of the grid assembly relative to the horizontal while maintaining a substantially constant relationship between the discharge end of the grid assembly and the tank outlet, means carried by the tank adjacent said inlet for supporting the receiving end of the grid frame in any of its tilted positions, means for tilting the said frame and its grid assembly, a set of baffles arranged lengthwise of and closely beneath the grid assembly, means for attaching the set of baffles to the grid assembly for tilting movement therewith and for pivotal movement relative to said grid assembly, means for interconnecting all of the baffles of the set in relative positions which are inclined to the horizontal in progressively decreasing amounts from one end to the other of the set in the direction of travel of the material over the grid assembly for controlling the direction of movement of the liquid impulses that pass upwardly through the grid assembly, and means for actuating said interconnecting means for simultaneously pivoting all of the baffles of the set while maintaining their relative progressively decreasing, inclined relationship.

11. A jig, comprising a stationary tank having an inlet and an outlet at its opposite ends, a rotatable horizontal shaft journaled in the tank adjacent to and parallel with said outlet, a frame positioned in the tank between the inlet and the outlet and fastened to said shaft to be tilted into different inclined positions when said shaft is rotated, means adjacent the tank inlet for supporting the corresponding end of the frame in its different tilted positions, a lever for rotating the shaft to tilt said frame, a series of parallel, spaced grid bars arranged longitudinally in the frame over which the material to be treated travels from the inlet to the outlet and between which liquid impulses will pass to effect the desired treatment of the traveling material, a series of transverse rods spaced longitudinally of the frame for supporting said grid bars in the frame, a set of baffles, equal in number to the rods, arranged in the frame, means for pivotally suspending one of the baffles from each one of said rods, means for interconnecting all of the baffles of the set for simultaneous pivotal movement and for holding the baffles in relative positions which are inclined to the horizontal in progressively decreasing amounts from one end to the other of the set in the direction of travel of the material over the grids for controlling the direction of movement of the liquid impulses that pass upwardly between the grids, and means for actuating the interconnecting means for pivoting the baffles relative to the grid bars and frame.

12. A jig, comprising a stationary tank having an inlet and an outlet at its opposite ends, a rotatable horizontal shaft journaled in the tank adjacent to and parallel with said outlet, a frame positioned in the tank between the inlet and the outlet and fastened to said shaft to be tilted into different inclined positions when said shaft is rotated, means adjacent the tank inlet for supporting the corresponding end of the frame in its different tilted positions, a lever for rotating the shaft to tilt said frame, a series of parallel, spaced grid bars arranged longitudinally in the frame over which the material to be treated travels from the inlet to the outlet and between which liquid impulses will pass to effect the desired treatment of the traveling material, a series of transverse rods spaced longitudinally of the frame for supporting said grid bars in the frame, a set of baffles; equal in number to the rods, arranged in the frame, means for pivotally suspending one of the baffles from each one of said rods for tilting movement as a unit with the frame, means for interconnecting all of the baffles of the set for simultaneous pivotal movement and for holding the baffles in relative positions which are inclined to the horizontal in progressively decreasing amounts from one end to the other of the set in the direction of travel of the material over the grids for controlling the direction of movement of the liquid impulses that pass upwardly between the grids, a second lever rotatably associated with said horizontal shaft for actuating the interconnecting means for pivoting the baffles relative to the grid bars and frame into the desired inclined positions relative to the horizontal for any given tilted position of the frame, and eccentric means for supporting the second lever on the horizontal shaft so that rotation of said shaft relative to the second lever, to tilt the frame, will cause the set of baffles to remain in the aforesaid desired inclined positions relative to the horizontal.

References Cited in the file of this patent

UNITED STATES PATENTS

| | | |
|---|---|---|
| 1,058,349 | Bookwalter | Apr. 8, 1913 |
| 1,083,481 | Bookwalter | Jan. 6, 1914 |
| 1,605,752 | McLean et al. | Nov. 2, 1926 |
| 1,866,951 | Soulary | July 12, 1932 |
| 2,132,750 | Muller | Oct. 11, 1938 |
| 2,147,822 | Peale | Feb. 21, 1939 |
| 2,161,500 | Bird | June 6, 1939 |
| 2,163,332 | Sutton | June 20, 1939 |
| 2,404,414 | Sutton | July 23, 1946 |

FOREIGN PATENTS

| | | |
|---|---|---|
| 12,925 | Great Britain | of 1892 |
| 321,670 | Great Britain | Nov. 7, 1929 |
| 634,431 | Germany | Aug. 6, 1936 |
| 758,274 | France | Oct. 23, 1933 |